United States Patent
Puri et al.

(10) Patent No.: US 6,763,596 B1
(45) Date of Patent: Jul. 20, 2004

(54) LASER ALIGNMENT DEVICE

(75) Inventors: Ash Puri, West Lafayette, IN (US);
Duard Wilson, Kankakee, IL (US);
John Davenport, Watseka, IL (US);
Bill Huff, Milford, IL (US)

(73) Assignee: Chicago Steel Tape Co., Watseka, IL (US)

( * ) Notice: Subject to any disclaimer, the term of this patent is extended or adjusted under 35 U.S.C. 154(b) by 0 days.

(21) Appl. No.: 10/226,407

(22) Filed: Aug. 23, 2002

(51) Int. Cl.⁷ .............................................. G01C 15/02
(52) U.S. Cl. ....................... 33/286; 33/227; 33/DIG. 21
(58) Field of Search ......................... 33/286, 227, 281, 33/282, 283, 285, 290, 294, DIG. 21, 535, 291

(56) References Cited

U.S. PATENT DOCUMENTS

| | | | |
|---|---|---|---|
| 3,936,197 A | 2/1976 | Aldrink et al. | 356/250 |
| 5,272,814 A | 12/1993 | Key | |
| 5,459,932 A | 10/1995 | Rando et al. | 33/291 |
| 5,500,524 A | 3/1996 | Rando | |
| 5,524,352 A | 6/1996 | Rando et al. | |
| 5,539,990 A * | 7/1996 | Le | 33/283 |
| 5,552,886 A | 9/1996 | Kitajima et al. | 33/291 |
| 5,617,202 A | 4/1997 | Rando | |
| 5,619,802 A | 4/1997 | Rando et al. | |
| 5,644,850 A | 7/1997 | Costales | |
| 5,754,287 A | 5/1998 | Clarke | |
| 5,798,828 A | 8/1998 | Thomas et al. | |
| 5,872,657 A | 2/1999 | Rando | |
| 5,983,510 A | 11/1999 | Wu et al. | |
| 6,005,716 A | 12/1999 | Ligtenberg et al. | |
| 6,035,540 A * | 3/2000 | Wu et al. | 33/286 |
| 6,043,879 A * | 3/2000 | Dong | 33/291 |
| 6,067,152 A | 5/2000 | Rando | |
| 6,154,319 A | 11/2000 | Rando et al. | |

* cited by examiner

Primary Examiner—Christopher W. Fulton
(74) Attorney, Agent, or Firm—Barnes & Thornburg LLP

(57) ABSTRACT

This invention is directed to a novel, portable, self-powered laser alignment device which can simultaneously generate plumb, square and level laser reference points. The laser alignment device is comprised of a main body that is pendulously suspended from a unit housing. The main body is adapted to house a plurality of orthogonally oriented laser diodes that, when energized, produce a plurality of orthogonal output beams to allow the operator to easily mark plumb, square and level reference points. The laser alignment device is self-leveling, which eliminates the time consuming calibration previously required for instrument setup. The movement of the main body is dampened by use of a magnetic dampening system that is comprised of a non-magnetic metallic plate, which is passed through a permanent magnetic field. The housing of the laser alignment device contains the main body, the laser diodes, the dampening system and a power supply to energize the diodes.

24 Claims, 4 Drawing Sheets

US 6,763,596 B1

LASER ALIGNMENT DEVICE

BACKGROUND OF THE INVENTION

The present invention relates to alignment devices for construction purposes and more specifically to a novel, portable, self-powered laser alignment device which can simultaneously generate plumb, square and level laser reference points.

Traditional instruments used to locate reference points on job sites, such as 3-4-5 triangles, plumb bobs, bubble vial levels, theodolites and transits, are time consuming and often require at least two individuals to obtain the locations of the desired reference points. These prior methods typically require specialized training to obtain accurate measurements. Laser diodes that can produce a linear light beam have been mounted to a leveled surface, to produce a horizontal line from which vertical or lateral measurements of objects or surfaces can be made. These laser devices only produce a single reference line and still require the laser to be leveled to obtain a true horizontal or vertical output beam. Other devices utilize a single diode in conjunction with reflective surfaces to divide up the laser beam creating multiple output beams. The division of a single beam weakens the output beams rendering them difficult to see in high light conditions, such as outdoors. These devices do not create bright output beams that allow the operator to simultaneously determine level, plumb, and square reference points.

SUMMARY OF THE INVENTION

The present invention is directed to a portable, self-powered laser alignment device which can simultaneously generate plumb, square and level laser reference points. The laser alignment device is comprised of a main body that is pendulously suspended in a housing. In the preferred embodiment, the main body is adapted to house five orthogonally oriented laser diodes that, when energized, produce five output beams that are orthogonal to adjacent beams to allow the operator to easily mark plumb, square and level reference points. The laser alignment device is self-leveling, which eliminates the time consuming calibration previously required for instrument setup. The movement of the main body is dampened by use of a magnetic dampening system that is comprised of a non-magnetic metallic plate that passes through a permanent magnetic field.

The housing of the laser alignment device contains the main body, the laser diodes, the dampening system and a power supply to energize the diodes.

These and other aspects of this invention are illustrated in the accompanying drawings and are more fully described in the following specification.

DETAILED DESCRIPTION OF THE INVENTION

Figure 1:
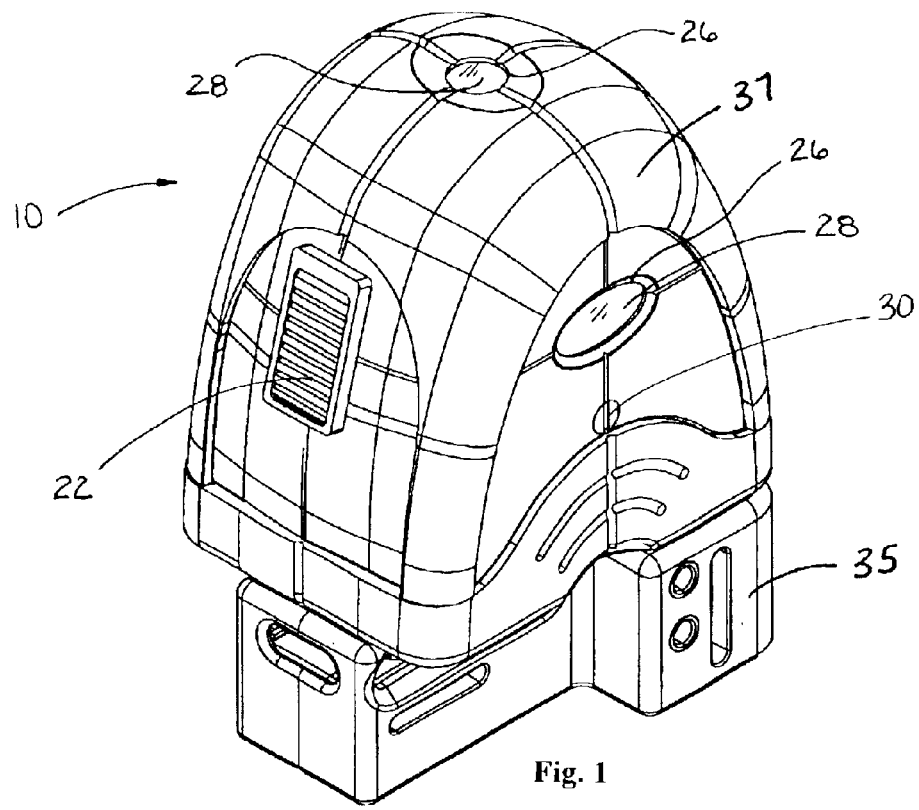
FIG. 1 is a perspective view of the laser alignment device of the present invention.

For the purpose of promoting an understanding of the principles of the invention, references will be made to the embodiment illustrated in the drawings. Specific language will also be used to describe the same. It will, nevertheless, be understood that no limitation of the scope of the invention is thereby intended, such alterations and further applications of the principles of the invention illustrated herein being contemplated as would normally occur to one skilled in the art to which the invention relates.

Figure 2:
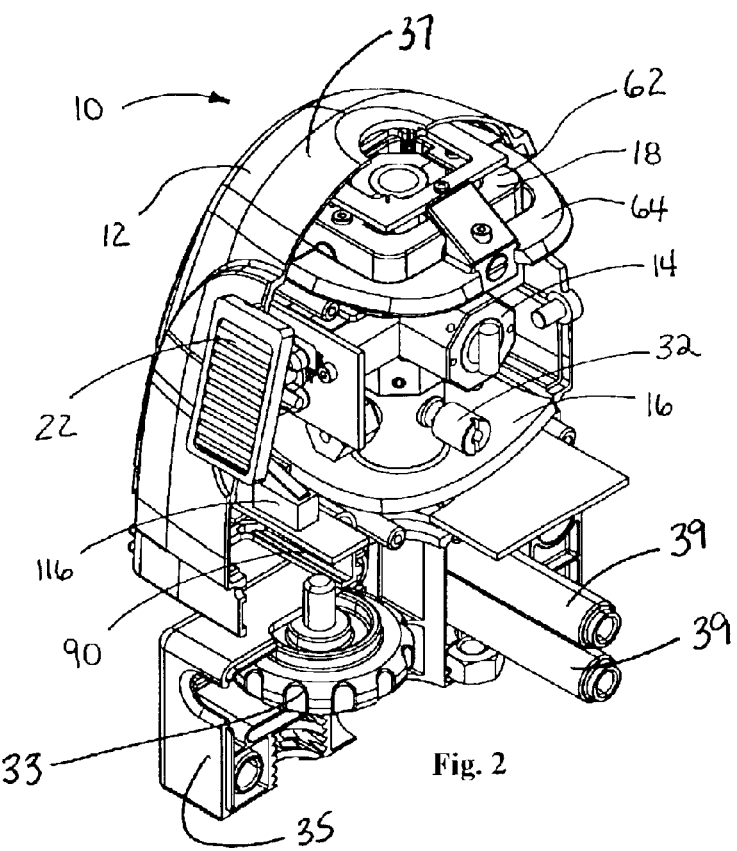
FIG. 2 is another perspective view partially broken away illustrating the left cover half and the internal components of the laser instrument of the present invention.
Figure 3:
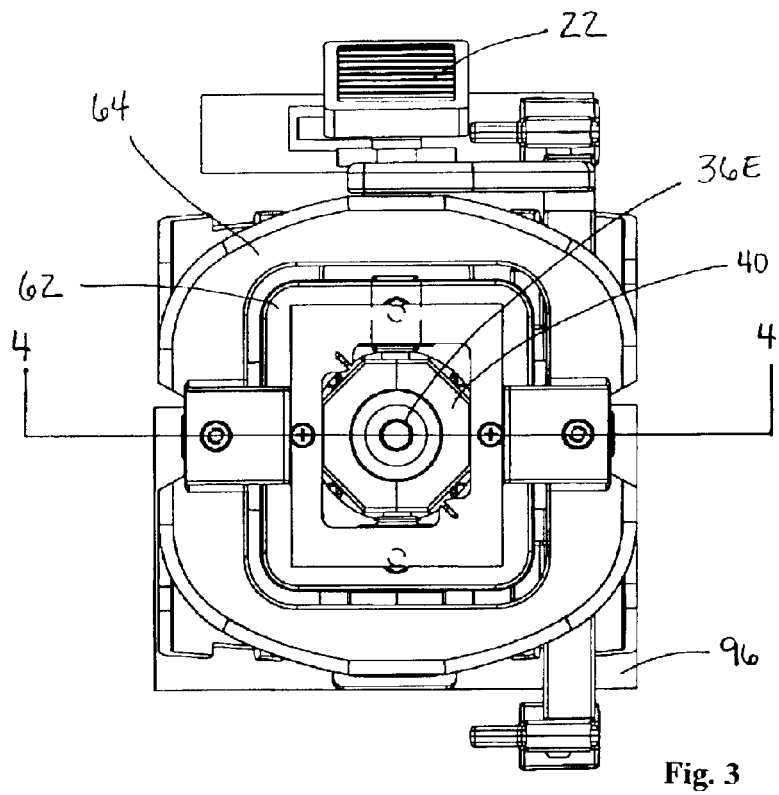
FIG. 3 is top view of the laser instrument of the present invention.

The laser alignment device 10, as illustrated in FIG. 1, is adapted to be positioned on a reasonably level and stable support surface and can simultaneously produce a plurality of beams having a perpendicular relationship with the other. The laser alignment device 10 is designed to be primarily used by the construction trade but may also be used by decorators or other individuals attempting to quickly and accurately determine level, plumb and square reference points. The preferred embodiment of the laser alignment device 10, as illustrated in FIG. 2, is comprised of a housing 12, a laser instrument 14, a dampening system 16 and a pivot system 18 and is designed to produce five laser output beams. If, for certain operations, more or fewer than five beams are required, additional lasers can be added or subtracted as needed.

The housing 12 of the laser alignment device 10 is designed to contain the laser instrument 14, the dampening system 16 and the pivot system 18 and is designed to seal out dust and moisture, as shown in FIG. 2. The housing 12 is also designed as a bumper to help protect the internal components in the event the device 10 is bumped or dropped. The housing 12 includes a switch 22 that is used to power the unit on and off. The switch 22 is also used to activate a locking mechanism 24, best shown in FIGS. 5 and 6, that prevents movement of the laser instrument 14 during transport. The housing 12, as shown in FIG. 1, also includes openings 26 that contain lenses 28, which allow laser generated light beams to pass through. The housing 12 further includes apertures 30 that permit access to weighted adjustment screws 32 used to balance the laser instrument 14, as shown in FIG. 2. Within the housing 12 is an adjustment wheel 33, which allows the base portion 35 to be connected to the top portion 37 of the housing 12. Also included in the housing 12 are bushings 39 adapted to allow for the passage of screws so the housing 12 can be fastened to a wall or other surface. The bushings 39 prevent the base portion 35 from deforming when the fastening screws are tightened.

Figure 4:
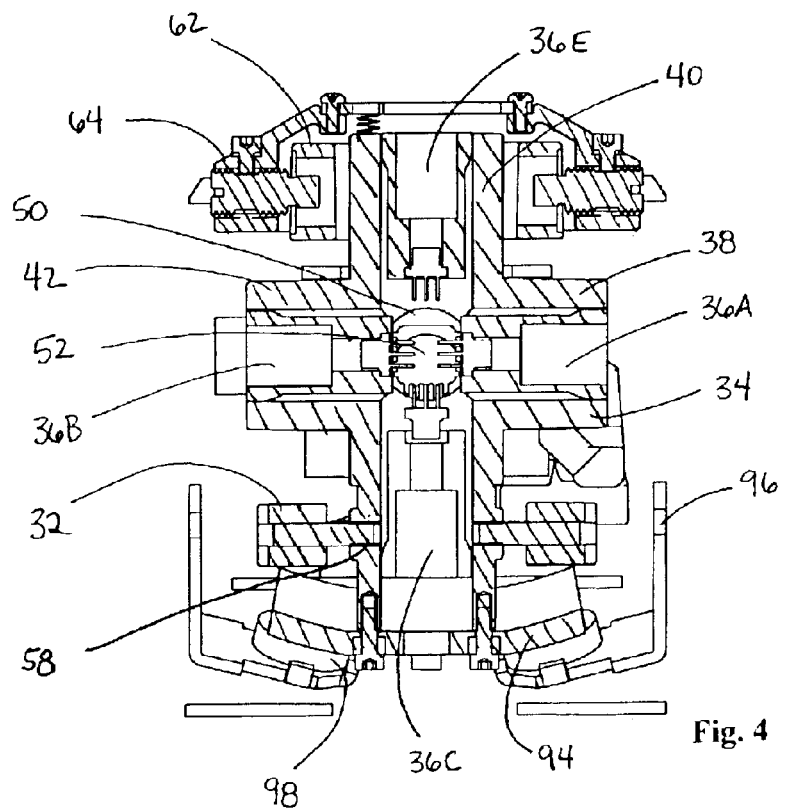
FIG. 4 is a side cross-sectional view of the laser instrument of FIG. 3, which is taken along line 4—4 as shown in FIG. 3.
Figure 5:
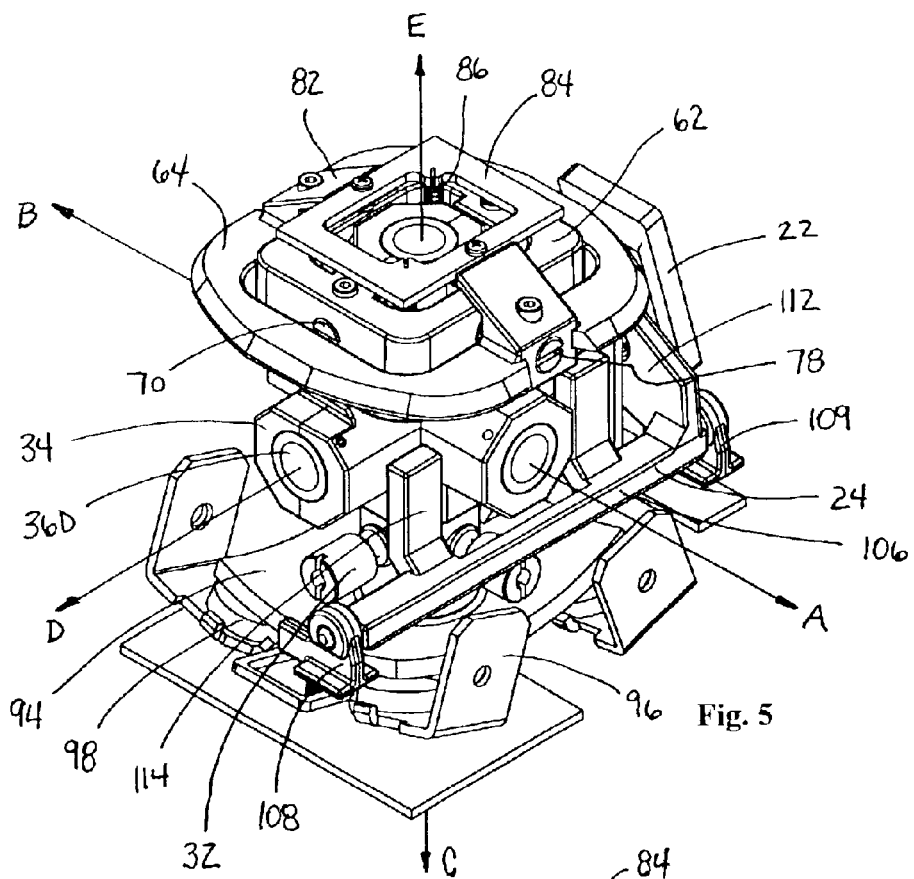
FIG. 5 is another perspective view illustrating the internal components of the laser instrument of the present invention.
Figure 6:
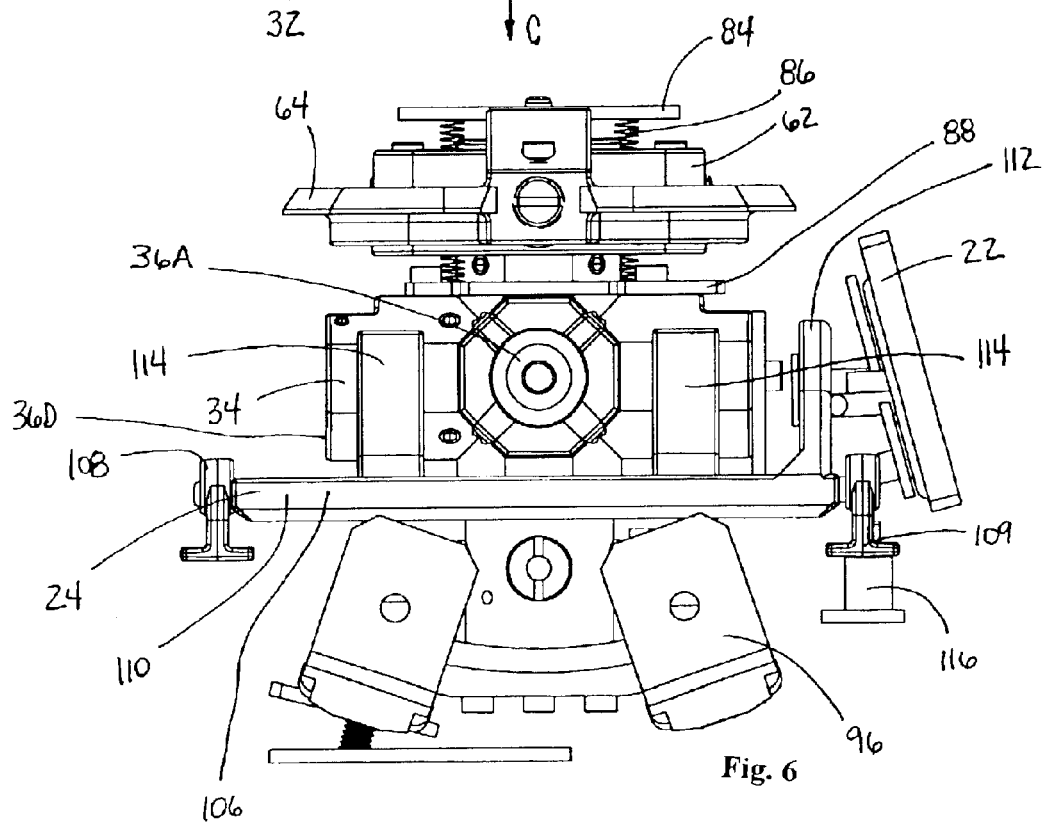
FIG. 6 is a side view of the laser instrument of the present invention.
Figure 7:
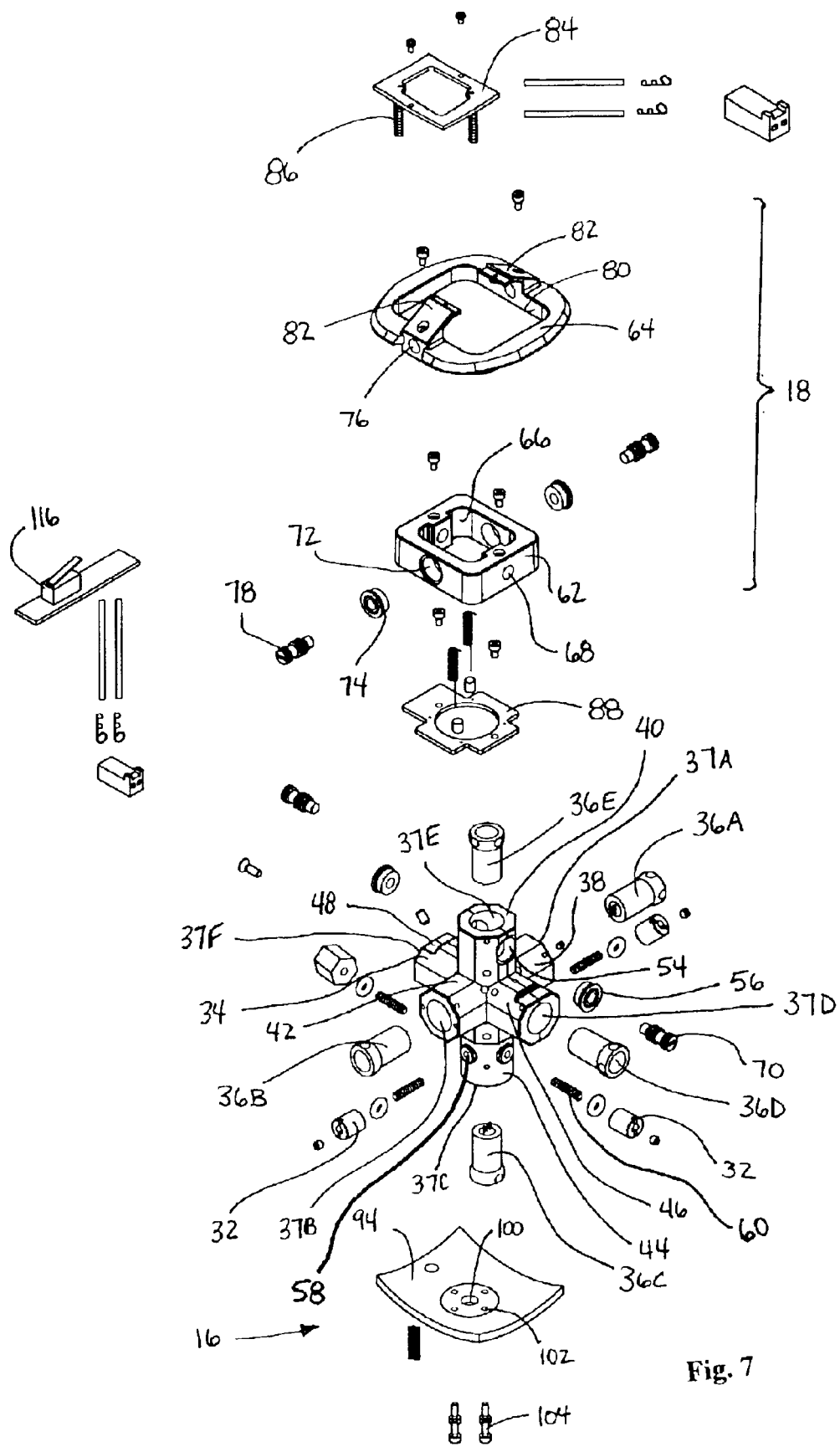
FIG. 7 is an exploded view of the laser instrument of the present invention.

The laser instrument 14 is positioned within the housing 12 and is designed to produce the desired orthogonal output beams. The laser instrument 14, as shown in FIGS. 4–7, is comprised of a main body 34 and multiple laser diodes 36A, 36B, 36C, 36D and 36E. Use of individual diodes creates brighter output beams, which produce highly visible reference points at much greater distances, in brighter light conditions. The diodes are arranged so that the light beams A, B, C, D and E emanating from the laser instrument are orthogonal to adjacent light beams, as shown in FIG. 5. For purposes of explanation, when we use the term "orthogonal beams" we mean the resultant beams which lie in three planes which are orthogonal to each other. For example, a horizontal plane which passes through beams A, B and D is orthogonal to the vertical plane which passes through beams A, B, C and E. Furthermore, the vertical plane which passes through beams C, D and E is orthogonal to the plane which passes beams A and B. When we reference beams as being "adjacent" we mean output beams that are oriented within 90° of each other. For example, beam A is adjacent to beams C, D and E but is coaxial with beam B. The main body 34 includes a plurality of posts 38, 40, 42, 44, 46 and 48 that include chambers 37A, 37B, 37C, 37D, 37E, and 37F all of which intersect at a central cavity 50, as shown in FIGS. 4 and 7. The chambers 37 extend outwardly from the central cavity 50 and are in a highly precise perpendicular relationship with each adjacent chamber 37. Posts 38, 40, 42, 44 and 46 each contain one of the diodes 36A–E as illustrated in FIG. 7. The diodes 36 connect with an electrical connector 52 located within the central cavity 50. The one word post 40 includes openings 54 that are adapted to accept bearings 56, which are used to pivot the laser instrument 14 about a first axis of rotation, as shown in FIG. 7. The lowest post 44 includes apertures 58 that are adapted to accept threaded shafts 60 and the weighted adjustment screws 32. The weighted adjustment screws 32 allow the laser instrument 14 to be calibrated during assembly as well as out in the field in the event the laser alignment device 10 becomes out of balance from a decalibrating impact.

The main body 34 of the laser instrument 14 is pendulously suspended from the housing 12, as shown in FIG. 2. The pivoting of the laser instrument 14 is accomplished by use of an inner gimbal 62 and an outer gimbal 64, as shown in FIGS. 5–7. The inner gimbal 62 includes a central opening 66 that is adapted to surround the uppermost post 40 of the main body 34. The inner gimbal 62 also includes apertures 68 that are adapted to accept inner gimbal pins 70. The inner gimbal pins 70 thread through the apertures 68 and engage the bearings 56 positioned within the post 40. The connection between the main body 34 of the laser instrument 14 and the inner gimbal 62 allows the laser instrument 14 to pivot about a first axis of rotation. The inner gimbal 62 also includes a second set of apertures 72 that are adapted to accept bearings 74.

The outer gimbal 64 is connected to the housing 12, best shown in FIGS. 2 and 7, and includes apertures 76 that are adapted to accept inner gimbal pins 78. The inner gimbal pins 78 engage the bearings 74 to allow the main body 34 of the laser instrument 14 to pivot about a second axis of rotation as shown in FIG. 7. The outer gimbal 64 also includes a central opening 80 that allows the outer gimbal 64 to be positioned around the inner gimbal 62, aligning the apertures 76 with the bearings 74 positioned within the inner gimbal 62. The outer gimbal 64 further includes inwardly extending brackets 82 that allow the attachment of a circuit board 84. The circuit board 84 includes springs 86 that extend downward through the openings 66 and 80 of the inner gimbal 62 and outer gimbal 64. The springs 86 contact a second circuit board 88 to transfer power from a power source 90 located in the housing 12 to the laser instrument 14 without inhibiting the movement of the laser instrument 14. The power source 90 used is a battery positioned within the housing 12 but an external source of power can also be used. The bearings 56 and 74 have very low resistance to allow the laser instrument 14 to pivot freely and reach equilibrium once the laser instrument 14 is placed upon a support surface. Even if the housing 12 is not level, the laser instrument 14 will pivot and naturally seek a level equilibrium. To reduce the amount of time required for the laser instrument 14 to reach equilibrium, the dampening system 16 is used.

The dampening system 16 is comprised of a damper plate 94, supports 96 and magnets 98, as shown in FIG. 7. The damper plate 94 is a rectangular non-magnetic metal plate that includes a centrally positioned opening 100 surrounded by four apertures 102. The damper plate 94 is typically made from copper or aluminum. The apertures 102 allow the damper plate 94 to be connected to the bottom post 44 with fasteners 104. The opening 100 in the center of the damper plate 94 allows laser light produced from the diode 36C positioned within the bottom post 44 to pass through. The damper plate 94 is curved to allow the plate 94 to remain a constant distance from the magnets 98 when passing through the magnetic field. The magnetic supports 96 are fastened to the housing 12 and each are adapted to support a magnet 98. The magnets 98 are arranged so that the damper plate 94 can freely pass over the magnets 98. Resistance is created when the damper plate 94 passes through the magnetic field. The resistive force slows the pendular movement of the main body 34 which aids the plate in reaching equilibrium. The dampening system 16 allows the laser instrument 14 to quickly level in the event the device is bumped during use. Alternate leveling systems can also be used to level the laser instrument 14. Electronic sensors interfaced with electric motors are used to sense the position of the laser instrument 14 with respect to the horizon and control the electric motors to level the laser instrument 14.

The laser alignment device 10 further includes the locking mechanism 24 that locks the damper plate 94 when the device is not in use, as shown in FIGS. 5 and 6. The locking mechanism 24 is comprised of a lock arm 106 and two lock arm brackets 108 and 109. The lock arm 106 includes a long shaft 110 that is pivotally connected to the lock arm bracket 108 at a first end and is rigidly connected to a fork member 112 at a second end. The shaft 110 further includes 2 outwardly extending lugs 114 that are designed to engage when the shaft 110 is in the locked position, preventing the main body 34 from moving. The fork member 112 of the shaft 110 engages the lock arm bracket 109 and the switch 22. When the switch 22 is moved upward to the on position, the fork member 112 is pivoted upward, causing the lugs 114 to pivot away from the damper plate 94, allowing the laser instrument 14 to pivot freely. Moving the switch 22 upward also engages electric switch 116, as shown in FIG. 2, which completes a circuit between the power source 90 and the laser diodes 36.

To operate the laser alignment device 10, it is first placed upon a tripod or other support surface. The device 10 does not have to be level but it is required to be oriented within five degrees of horizontal. Once the device 10 is properly supported, the switch 22 is slid upward. The sliding of the switch 22 causes the lug 114 on the lock arm 106 to pivot outward, releasing the damper plate 94 and the laser instrument 14 allowing them to freely pivot until equilibrium is reached. Sliding the switch 22 also causes engagement with the electric switch 116 which completes a circuit from the power source 90 through wiring and the circuit boards 84 and 88 to the laser diodes 36. Within a short duration after the switch 22 is moved to the "on" position, the laser instrument 14 reaches an equilibrium aided by the dampening system 16 and projects five orthogonal laser beams illustrated as beams A, B, C, D and E in FIG. 5. These beams produce level, plumb, and square reference points.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A self-leveling multi-beam laser alignment device comprising:
   a main body, pivotable about a first and a second axis of rotation;
   a plurality of laser diodes, each adapted to produce a separate output beam, positioned within said main body, said laser diodes oriented orthogonal with respect to each said adjacent diode such that each output beam is orthogonal to said adjacent output beams;
   a power source for supplying power to said laser diodes;
   a dampening mechanism attached to said main body and adapted to dampen pendular movement of said main body, said dampening mechanism including a non-ferrous metallic plate attached to said main body with an opening positioned to permit an output beam from a laser diode to pass therethrough.

2. The self-leveling multi-beam laser alignment device of claim 1, further comprising a switch mechanism connected to said housing adapted to electrically connect said power source to said laser diodes when said switch mechanism is in an on position.

3. The self-leveling multi-beam laser alignment device of claim 2, further comprising a locking mechanism associated with said switch mechanism and adapted to secure said main body in a fixed position when said switch is in an off position.

4. The self-leveling multi-beam laser alignment device of claim 1, wherein said main body includes a plurality of orthogonally oriented posts, said posts each having a chamber adapted to accept one of said laser diodes.

5. The self-leveling multi-beam laser alignment device of claim 1, wherein said main body further includes a plurality of weighted adjustment screws adapted to allow balancing of said main body.

6. The self-leveling multi-beam laser alignment device of claim 1, wherein said main body is pivotally connected to an inner gimbal to allow said main body to pivot about said first axis of rotation.

7. The self-leveling multi-beam laser alignment device of claim 6, wherein said inner gimbal is pivotally connected to an outer inner gimbal to allow said main body to pivot about said second axis of rotation.

8. The self-leveling multi-beam laser alignment device of claim 1, wherein said non-ferrous metallic plate attached to said main body is adapted to pass through a magnetic field producing a resistance force to dampen the movement of said main body.

9. The self-leveling multi-beam laser alignment device of claim 8, wherein said plate is made from copper.

10. The self-leveling multi-beam laser alignment device of claim 8, wherein said plate is made from aluminum.

11. An auto leveling multi-beam laser alignment device comprising:
    a main body, pivotable about a first and a second axis of rotation;
    a plurality of laser diodes, each adapted to produce a separate output beam, positioned within said main body, said laser diodes oriented orthogonal with respect to each said adjacent diode such that each output beam is orthogonal to said adjacent output beams;
    a power source for supplying power to said laser diodes;
    a dampening mechanism attached to said main body and adapted to dampen pendular movement of said main body,
    a switch mechanism connected to said housing adapted to electrically connect said power source to said laser diodes when said switch mechanism is in an on position; and a locking mechanism associated with said switch mechanism and adapted to secure said main body in a fixed position when said switch is in an off position.

12. The auto-leveling multi-beam laser alignment device of claim 11, wherein said laser instrument includes a plurality of posts having an orthogonal relationship with respect to each other adjacent posts, said posts each having a chamber adapted to accept one of said laser diodes.

13. The auto-leveling multi-beam laser alignment device of claim 11, wherein said laser instrument further includes a plurality of weighted adjustment screws adapted to allow balancing of said laser instrument.

14. The auto-leveling multi-beam laser alignment device of claim 11, wherein said pendulously suspended laser instrument is suspended by pivotally connecting said laser instrument to an inner gimbal to allow said laser instrument to pivot about said first axis of rotation.

15. The auto-leveling multi-beam laser alignment device of claim 14, wherein said inner gimbal is pivotally connected to an outer gimbal to allow said pendulously suspended laser instrument to pivot about said second axis of rotation.

16. A self-leveling multiple beam laser alignment device comprising:
    a main body, pivotable about a first and a second axis of rotation;
    a plurality of laser diodes, each adapted to produce a separate output beam, positioned within said main body, said laser diodes oriented orthogonal with respect to each said adjacent diode such that each output beam is orthogonal to said adjacent output beams;
    a power source for supplying power to said laser diodes;
    a dampening mechanism attached to said main body and adapted to dampen pendular movement of said main body; said main body further includes a plurality of weighted adjustment screws adapted to allow balancing of said main body.

17. The self-leveling multiple beam laser alignment device of claim 16, further comprising a switch connected to said housing and adapted to engage an electric switch to electrically connect said power supply to said laser diodes when said switch is in an on position.

18. The self-leveling multiple beam laser alignment device of claim 17, further comprising a locking mechanism associated with said switch and adapted to secure said main body in a fixed position from moving when said switch is in an off position.

19. The self-leveling multiple beam laser alignment device of claim 16, wherein said main body includes a plurality of orthogonally oriented posts, said posts each having one of said openings adapted to accept one of said laser diodes.

20. The self-leveling multiple beam laser alignment device of claim 16, wherein said pendulous suspension of said main body is accomplished by pivotally connecting the main body to an inner gimbal to allow said main body to pivot about said first axis of rotation.

21. The self-leveling multiple beam laser alignment device of claim 20, wherein pendulous suspension of said main body is further accomplished by pivotally connecting said inner gimbal to an outer gimbal to allow said main body to pivot about said second axis of rotation.

22. The self-leveling multiple beam laser alignment device of claim 16, wherein said dampening mechanism includes a non-ferrous metallic plate that is attached to said main body and adapted to pass through a magnetic field producing a resistance force to dampen the movement of said main body.

23. The self-leveling multiple beam laser alignment device of claim 22, wherein said plate is made from copper.

24. The self-leveling multiple beam laser alignment device of claim 22, wherein said plate is made from aluminum.

* * * * *